(12) United States Patent
Kim et al.

(10) Patent No.: US 7,813,623 B2
(45) Date of Patent: *Oct. 12, 2010

(54) METHOD AND APPARATUS FOR CREATING STILL PICTURE MANAGEMENT DATA ON A REWRITABLE STORAGE MEDIA

(75) Inventors: Byung-Jin Kim, Kyunggido (KR); Kang-Soo Seo, Kyunggido (KR); Ki-Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 1474 days.

This patent is subject to a terminal disclaimer.

(21) Appl. No.: 10/321,362

(22) Filed: Dec. 18, 2002

(65) Prior Publication Data

US 2003/0086697 A1 May 8, 2003

Related U.S. Application Data (63) Continuation of application No. 09/339,050, filed on Jun. 23, 1999, now Pat. No. 6,519,415.

(30) Foreign Application Priority Data

Jun. 23, 1998 (KR) .................................. 98-23777

(51) Int. Cl.
  H04N 7/26 (2006.01)
  H04N 5/91 (2006.01)
  H04N 7/00 (2006.01)
  H04N 5/00 (2006.01)
(52) U.S. Cl. .......................... 386/109; 386/95; 386/125; 386/126
(58) Field of Classification Search .................. 386/4, 386/45, 46, 69, 83, 95, 97, 98, 105, 106, 386/112, 120, 121, 125, 126; 348/231.1, 348/231.2, 231.3, 588
See application file for complete search history.

(56) References Cited

U.S. PATENT DOCUMENTS 4,613,908 A 9/1986 Takahashi et al.
4,633,329 A 12/1986 Sugiyama et al.

(Continued)

FOREIGN PATENT DOCUMENTS

CN 1240293 1/2000
EP 0847195 A1 10/1998

(Continued)

(Continued)

OTHER PUBLICATIONS

"Design Rule for Camera File System", Version 1.0, JEIDA-49/2/1998, Est. Dec. 1998, Japan Electronic Industry Development Association.

Primary Examiner—Thai Tran
Assistant Examiner—Hung Q Dang
(74) Attorney, Agent, or Firm—Birch, Stewart, Kolasch & Birch, LLP (57) ABSTRACT

A process and system for creating and recording still picture management data in a rewritable storage media making it possible to reduce the amount of navigation information and index information necessary by grouping a plurality of still pictures according to their attributes, thus sharing navigation information and recording index information of still pictures with common attributes linked by the shared navigation information. In the method of the present invention, instead of creating navigation information and index information of each still picture, a plurality of still pictures share navigation information according to their attributes or those of audio signals linked to the still pictures and index information of the still pictures are recorded based on the shared navigation information, thereby effectively reducing the amount of navigation information and index information required for reproduction of still pictures recorded on a rewritable storage media.

20 Claims, 7 Drawing Sheets

U.S. PATENT DOCUMENTS

| | | |
|---|---|---|
| 5,517,476 A | 5/1996 | Hayashi |
| 5,675,358 A | 10/1997 | Bullock et al. |
| 5,745,643 A | 4/1998 | Mishina |
| 5,796,428 A * | 8/1998 | Matsumoto et al. ......... 348/588 |
| 5,806,072 A * | 9/1998 | Kuba et al. ............... 348/231.2 |
| 5,895,123 A | 4/1999 | Fuji et al. |
| 6,088,507 A | 7/2000 | Yamauchi et al. |
| 6,108,423 A | 8/2000 | Sako et al. |
| 6,141,044 A | 10/2000 | Anderson et al. |
| 6,353,703 B1 | 3/2002 | Tatsumi et al. |
| 6,519,415 B1 * | 2/2003 | Kim et al. .................... 386/98 |
| 6,871,004 B1 | 3/2005 | Bando et al. |
| 7,107,516 B1 | 9/2006 | Anderson et al. |

FOREIGN PATENT DOCUMENTS

| | | |
|---|---|---|
| JP | 6149905 | 5/1994 |
| JP | 06-324934 | 11/1994 |
| JP | 6324934 | 11/1994 |
| JP | 2001054041 | 2/2001 |
| JP | 2001157155 | 6/2001 |
| JP | 2001211418 | 8/2001 |
| KR | 2000006198 | 1/2000 |

\* cited by examiner

FIG. 1

| | | | |
|---|---|---|---|
| Video Manager Information (VMGI) | | | |
| Movie AV File Information Table (M_AVFIT) | | | |
| Still Picture AV File Information (S_AVFIT) | Still Picture AV File Information Table Information (S_AVFITI) | | S_AVFI_Ns |
| | | | S_AVFIT_EA |
| | Still Picture AV File Information (S_AVFI) | Still Picture AV File Information General Information (S_AVFGI) | S_VOBI_Ns |
| | | Still Picture VOB information #i (S_VOB #i) | VOB_ID |
| | | | VOB_TY |
| | | | ⋮ |
| Original PGC Information Table (ORG_PGCIT) | Original PGC Information Table Information (ORG_PGCITI) | | ORG_PGC_SRP_Ns |
| | | | ORG_PGCIT_EA |
| | Original PGC Search Pointer (ORG_PGCI_SRP) | | ORG_PGC_SA |
| | Original PGC Information (ORG_PGCI) | PGC General Information (PGCI) | C_Ns |
| | | Cell Information #i (CI #i) | C_TY |
| | | | VOB_ID |
| | | | ⋮ |
| User Defined PGC Information Table (UD_PGCIT) | | | |
| Text Data Manager (TXT_DT_MG) | | | |
| Manufacturer's Information Table (MNFIT) | | | |

*Conventional Art*

FIG. 2

*Conventional Art*

| S_VOBI #i | S_VOBGI | VOB_ID |
| | | VOB_TY |
| | | VOB_PB_TM |
| | | VOB_REC_TM |
| | | STILL_PIC_Ns |
| | S_VOB_STI | V_ATR |
| | | A_ATR |
| | PART_OF_VOBI | V_PARTI | V_PART_S_ADR #1 |
| | | | V_PART_SZ #1 |
| | | | V_PART_SZ #2 |
| | | | ............ |
| | | | V_PART_SZ #S |
| | | A_PARTI | A_PART_S_ADR #1 |
| | | | A_PART_SZ #1 |
| | | | A_PART_SZ #2 |
| | | | ............ |
| | | | A_PART_SZ #S |

FIG. 5

| CI #i | C_TY | C_TY |
| | S_CI | VOB_ID |
| | | C_PB_TM |
| | | PIC_S_N (=K) |
| | | PIC_E_N (=K+L-1) |
| | | PIC_STILL_TM |
| | | PIC_PB_TM #1 |
| | | PIC_PB_TM #2 |
| | | ............ |
| | | PIC_PB_TM #L |
| | | IT_TXT_N |
| | | THMNL_N |

FIG. 8

METHOD AND APPARATUS FOR CREATING STILL PICTURE MANAGEMENT DATA ON A REWRITABLE STORAGE MEDIA

This application is a continuation of application Ser. No. 09/339,050, filed on Jun. 23, 1999 now U.S. Pat. No. 6,519,415, the entire contents of which are hereby incorporated by reference and for which priority is claimed under 35 U.S.C. § 120; and this application claims priority of Application No. 1998-23777 filed in Republic of Korea on Jun. 23, 1998 under 35 U.S.C. § 119.

BACKGROUND OF THE INVENTION

1. Field of the Invention

The present invention relates generally to a method and apparatus for creating still picture management data on a rewritable storage media, and more particularly, but not by way of limitation, to a method and apparatus capable of reducing the amount of navigation information and index information needed to record still pictures on a rewritable storage media.

2. Brief Description of the Related Art

Currently, a great number of optical disks are being used in various fields. With the advent of the DVD (Digital Versatile Disc), it is expected that more and more optical disks will come into use. Optical disks currently include read-only disks such as the CD-ROM and DVD-ROM and record-once disks such as the CD-R and DVD-R. In addition, specifications for rewritable optical disks such as the CD-RW, DVD-RAM, and so forth are now under discussion.

Since rewritable optical disks like the DVD-RAM have very large capacity, they can store a good many moving/still images. When moving/still images are recorded on a rewritable storage media, information for search and retrieval of the images is created and recorded in a navigation information file on the storage media.

Figure 1:
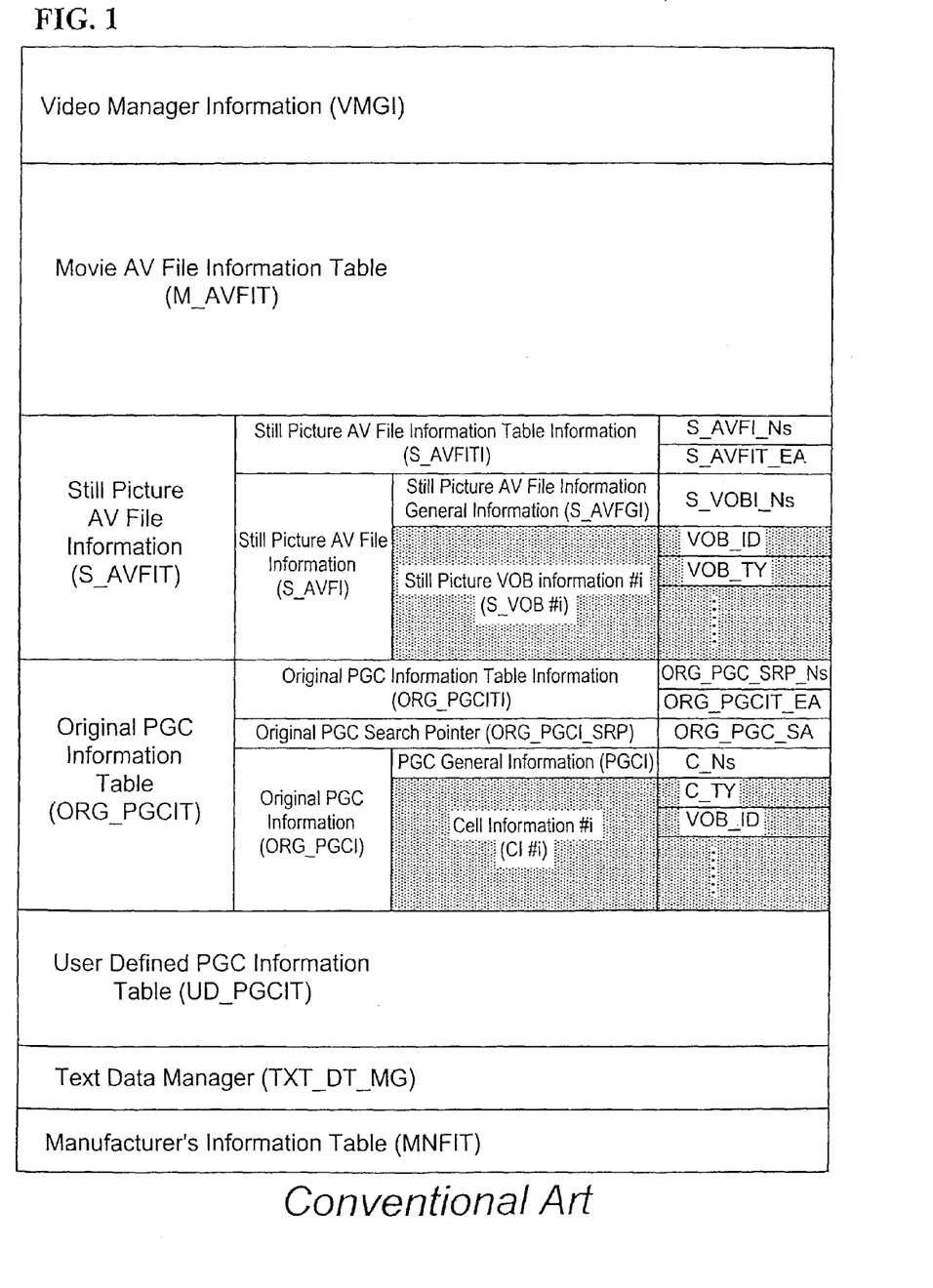
FIG. 1 is a view of the structure of a navigation information file.

The structure of the navigation information file is shown in FIG. 1, wherein the VOB (Video Object) information field and cell information field are created and inserted in the navigation information file, each time a moving or still image is recorded on the storage media. When reproducing images, the navigation information file is loaded into a memory, and a requested moving or still image is searched for and reproduced from the storage media based on the navigation information.

Figure 2:
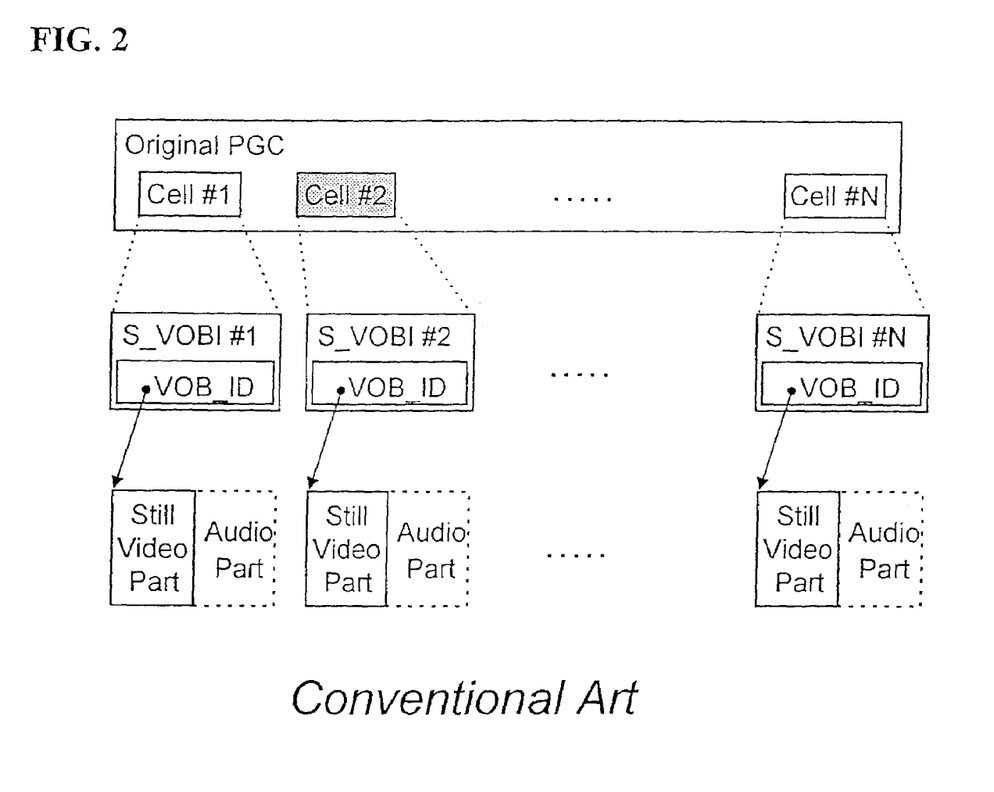
FIG. 2 is a view of creating navigation information in a conventional still picture management method.

Since still pictures are much smaller in size than moving pictures, a large number of still pictures can be recorded in a storage media—for example, a 4.7 GB storage media can store more than 60 thousand still pictures. Therefore, when a high-capacity storage media is filled with only still pictures, the amount of necessary navigation information increases relative to the stored still images. When a still picture or audio data linked to the still picture is recorded, the two information fields in FIG. 1 (i.e., VOB information and cell information (CI) fields) take up 84 bytes (e.g., S_VOB (36 bytes)+Cell (2×24 bytes)) including the reserved area. In the above example, therefore, the size of the two information fields needed to store 60 thousand still pictures is 5040 KB (84× 60000). FIG. 2 shows the relation between VOB information and cell information created when still pictures are recorded.

As a result, even when limited to storage of still pictures, the size of the navigation information file in a storage media exceeds 5 MB. As mentioned above, the navigation information file needs to be loaded into a memory and searched to locate and retrieve a requested still picture from the media; hence a large memory is required merely to store the navigation information temporarily. If the size of the memory is limited, for example less than 512 Kbytes, the number of still pictures to be recorded should also be limited despite the large capacity of the storage media, which is a major problem of the conventional still picture management method.

SUMMARY OF THE INVENTION

The present invention is directed to system that substantially obviates one or more of the problems experienced due to the above and other limitations and disadvantages of the related art.

It is an object of the present invention to provide a method and apparatus for creating and recording still picture management data in a rewritable storage media, which remarkably reduces the size of necessary still picture management data by sharing navigation information of a plurality of still pictures.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes a method for recording pictures such as still pictures on a rewritable storage media including recording obtained still pictures in sequence; examining conditions for grouping the recorded still pictures into single video object (VOB); and creating and recording navigation information for the still pictures grouped according to the examination result. Furthermore, the method linked to the still pictures on a rewritable storage media includes recording obtained still pictures and/or audio signals which will be reproduced together with correspondent still pictures; examining conditions of still pictures or audio signals for grouping the recorded still pictures and/or audio signals into single data object which may consist of only audio data instead of only video or mixed data; and creating and recording of navigation information for the still pictures and/or audio signals grouped according to the examination result.

In addition, the present invention includes a rewritable storage device, the contents of the rewritable storage device including several or recorded pictures, one or more groups of the recorded pictures having one or more common attributes; and navigation information used to identify the groups of recorded pictures based on the common attributes shared by the pictures within the groups. The recorded pictures are generally still pictures, and the number of pictures in a group is generally limited to a present maximum number. The navigation information includes information on a start address of a corresponding group identified by the navigation information and information on sizes of the still pictures within the group identified by the navigation information. The information on the sizes of the still pictures within the group is recorded sequentially according to a recording order of the still pictures within the group, the information on the sizes identifying the size of more than one still picture within the group.

In the present invention, conditions for grouping the recorded still pictures and audio signals linked to the still pictures into VOBs include attributes of the still pictures and audio signals and the maximum number of still pictures which a VOB can contain.

It is to be understood that both the foregoing general description and the following detailed description are exemplary and explanatory and are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features and characteristics of the present invention; methods, operation, and functions of the related elements of the structure; combinations of parts; and economies of manufacture will surely become apparent from the following detailed description of the preferred embodiments and accompanying drawings, all of which form a part of this specification, wherein like reference numerals designate corresponding parts in various figures.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFERRED EMBODIMENTS

Reference will now be made in detail to the preferred embodiments of the present invention, examples of which are illustrated in the accompanying drawings. In the drawings, redundant description of like elements and processes, which are designated with like reference numerals, is omitted for brevity.

Figure 3:
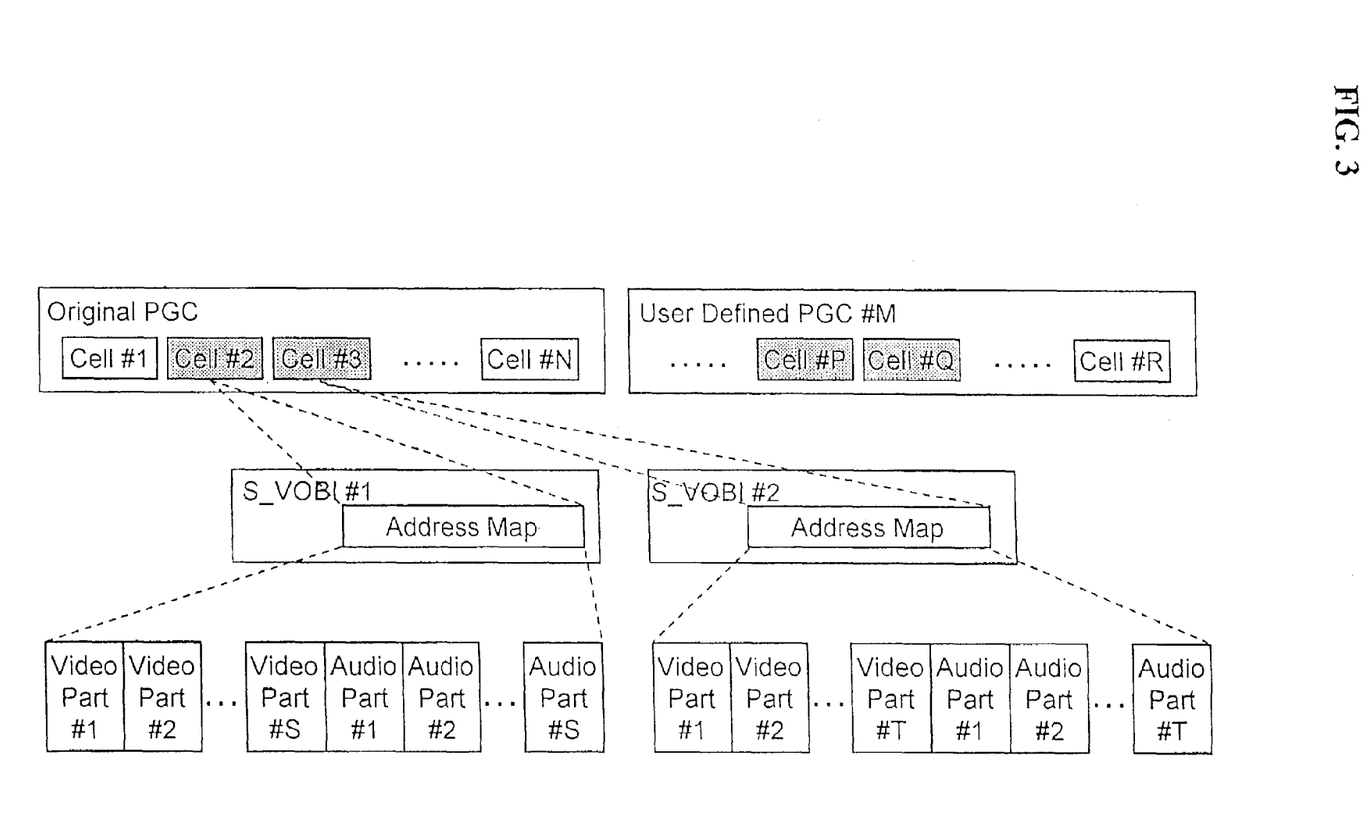
FIG. 3 is a view of the structure of still picture management data as an embodiment according to the present invention.

FIG. 3 shows an example of the structure of still picture management data according to the present invention. The program chain (PGC) is composed of an original PGC and a user-defined PGC, each of which comprises a plurality of movie cells and still picture cells. The video object information (VOBI) is the information for reproducing a video object (VOB). Each VOBI (S_VOBI #1~S_VOBI #N) has an address map containing addresses of video parts (Video Part #1~Video Part #S) and audio parts (Audio Part #1~Audio Part #S) of a plurality of still pictures pertaining to the corresponding VOB. The VOB includes video parts (Video Part #1~Video Part #S) of still pictures and audio parts (Audio Part #1~Audio Part #S) linked to the video parts, wherein the video parts are first recorded in order of the inputted still pictures and then the audio parts linked to the video parts are recorded in the same order. Similarly, the addresses of the video parts and audio parts linked to the video parts are recorded in the address map of each VOBI (S_VOBI #1 S_VOBI #N) in order of the inputted still pictures.

A still picture may contain only a video part or both a video part and an audio part linked to the video part, depending on whether audio data are obtained together when the still picture is taken. According to the present invention, a VOB comprises a group of still pictures with common attributes, which are categorized into video attributes and audio attributes.

Figure 6A:
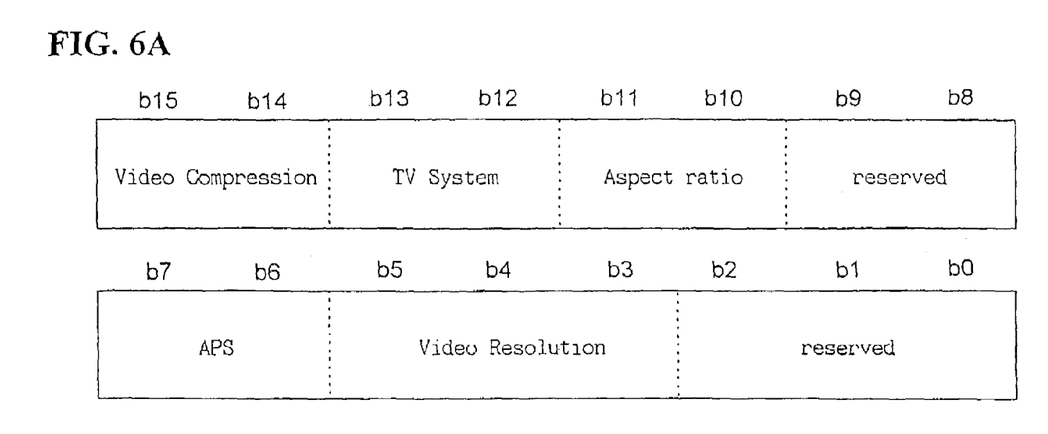
FIGS. 6A and 6B are examples of the data format of the video attribute (V_ATR) and audio attribute (A_ATR) shown in FIG. 4 according to the present invention.

As shown in FIG. 6A, video attributes include the video compression mode (MPEG 1, MPEG 2, etc.), TV system mode (525/60, 625/50, etc.), aspect ratio (4:3, 16:9, etc.), analog protection system APS (on or off), video resolution (720×480, 704×480, 352×480, 352×240, etc.), and the like.

Figure 6B:
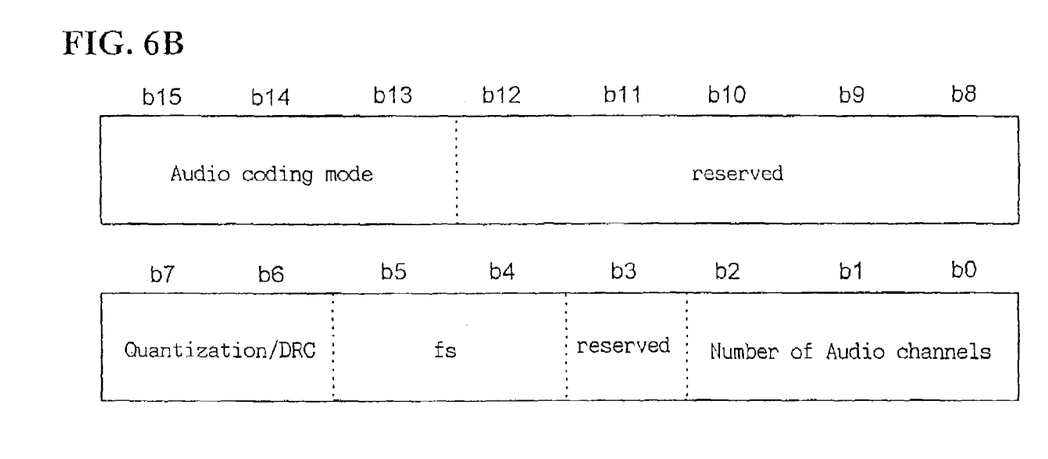

As shown in FIG. 6B, audio attributes include the audio coding mode (Dolby, MPEG-1, MPEG-2, linear PCM audio, etc.), quantization/dynamic range control (DRC), sampling frequency, number of audio channels (mono, stereo, dual mono, etc.), and the like.

Considering the fact that a user may take many still pictures with the attributes fixed, the above grouping method might cause the problem that too many still pictures are included in a VOB, which makes search of still pictures difficult. Motivated by this, the present invention contemplates grouping still pictures according to their attributes and also limiting the maximum number of still pictures that a VOB can contain, thereby not only reducing the size of still picture management data but facilitating search of still pictures. The maximum number of still pictures pertaining to a VOB can be, for example, 32, 64, 128, etc. The attributes of still pictures can be set or changed by a user when the pictures are taken using photographing apparatuses like digital cameras, or when the still pictures are edited using recording/reproduction apparatuses capable of recording still pictures.

As depicted in FIG. 3, the present invention can simplify the structure of still picture management data in that a plurality of still pictures are grouped according to their attributes and in that a group of still pictures can be represented by a single VOBI.

Figure 4:
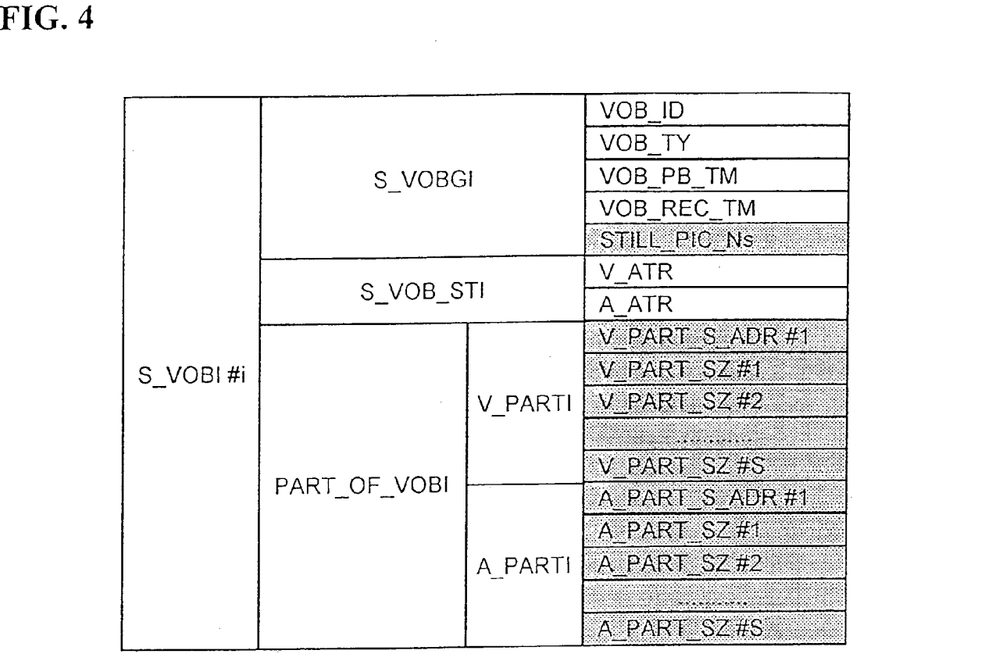
FIG. 4 is an example of the data format of the video object information (VOBI) shown in FIG. 3 according to the present invention.

FIG. 4 depicts an example of the data format of the VOBI shown in FIG. 3, wherein S_VOBI #I comprises S_VOBGI (still picture VOB general information), S_VOB_STI (still VOB stream information), and PART_OF_VOBI (part of VOBI) composed of V_PARTI (video part information) and A_PARTI (audio part information).

Furthermore, the S_VOBGI comprises VOB_ID (VOB identification code), VOB_TY (VOB type), VOB_PB_TM (VOB playback time), VOB_REC_TM (VOB recording time), and STILL_PIC_Ns (still picture numbers), which is the number of still pictures grouped into a VOB and has a size of 2 bytes. The S_VOB_STI comprises V_ATR (video attributes) configured as shown in FIG. 6A and A_ATR (audio attributes) configured as shown in FIG. 6B.

The V_PARTI is composed of V_PART S_ADR #1 (video part start address) and V_PART_SZ #1~V_PART_SZ #S (sizes of video part #1~video part #S contained in the VOB). Likewise, the A_PARTI is composed of A_PART_S_ADR#1 (audio part start address) and A_PART_SZ #1~A_PART_SZ #S (sizes of audio part #1~audio part #N contained in the VOB). The A_PART_SZ #I may be 0, in which case the i-th still picture contains no audio part.

Figure 5:
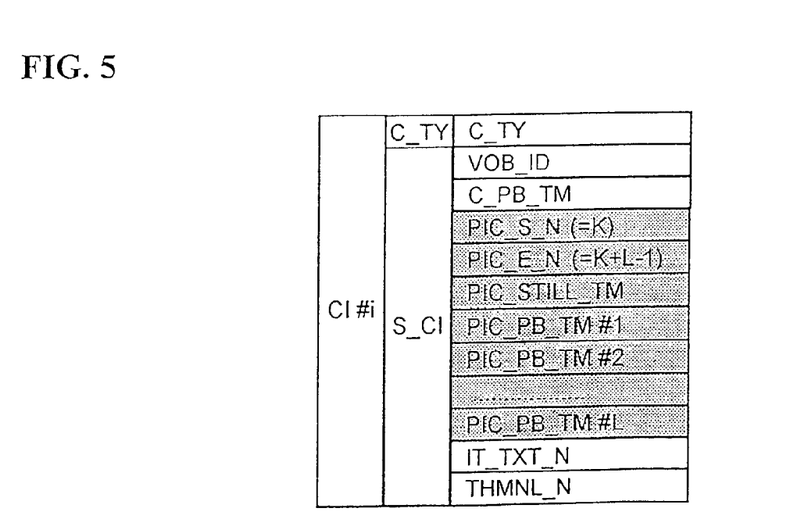
FIG. 5 is an example of the data format of the cell information shown in FIG. 3 according to the present invention.

FIG. 5 shows an example of the data format of the cell information shown in FIG. 3, wherein CI #I (cell information #I) comprises C_TY (cell type) indicative of whether the corresponding cell is a still picture or a moving picture and S_CI (still picture cell information). The S_CI comprises VOB_ID (VOB identification code), C_PB_TM (cell playback time), PIC_S_N (index number of the picture to be reproduced first), PIC_E_N (index number of the picture to be produced last), PIC_STILL_TM (holding time of each picture after being reproduced), PIC_PB_TM #1~PIC_PB_TM #L (playback times of picture #1~picture #L), IT_TXT_N (item text number), and THMNL_N (thumbnail picture number). If the number of still pictures (STILL_PIC_Ns) to be reproduced is L and the index of the picture to be reproduced first (PIC_S_N) is K, then the index number of the picture to be reproduced last (PIC_E_N) becomes K+L−1.

It was verified that the still picture management method according to the present invention remarkably reduces the amount of VOBI data created in a navigation information file, compared to the conventional method. More explicitly, in the case where 10 still pictures are recorded on a storage media, 360 bytes are needed for VOBI data in the conventional method while 74 bytes are needed in the method of the present invention, which amounts to 79% VOBI data decrease.

Figure 7:
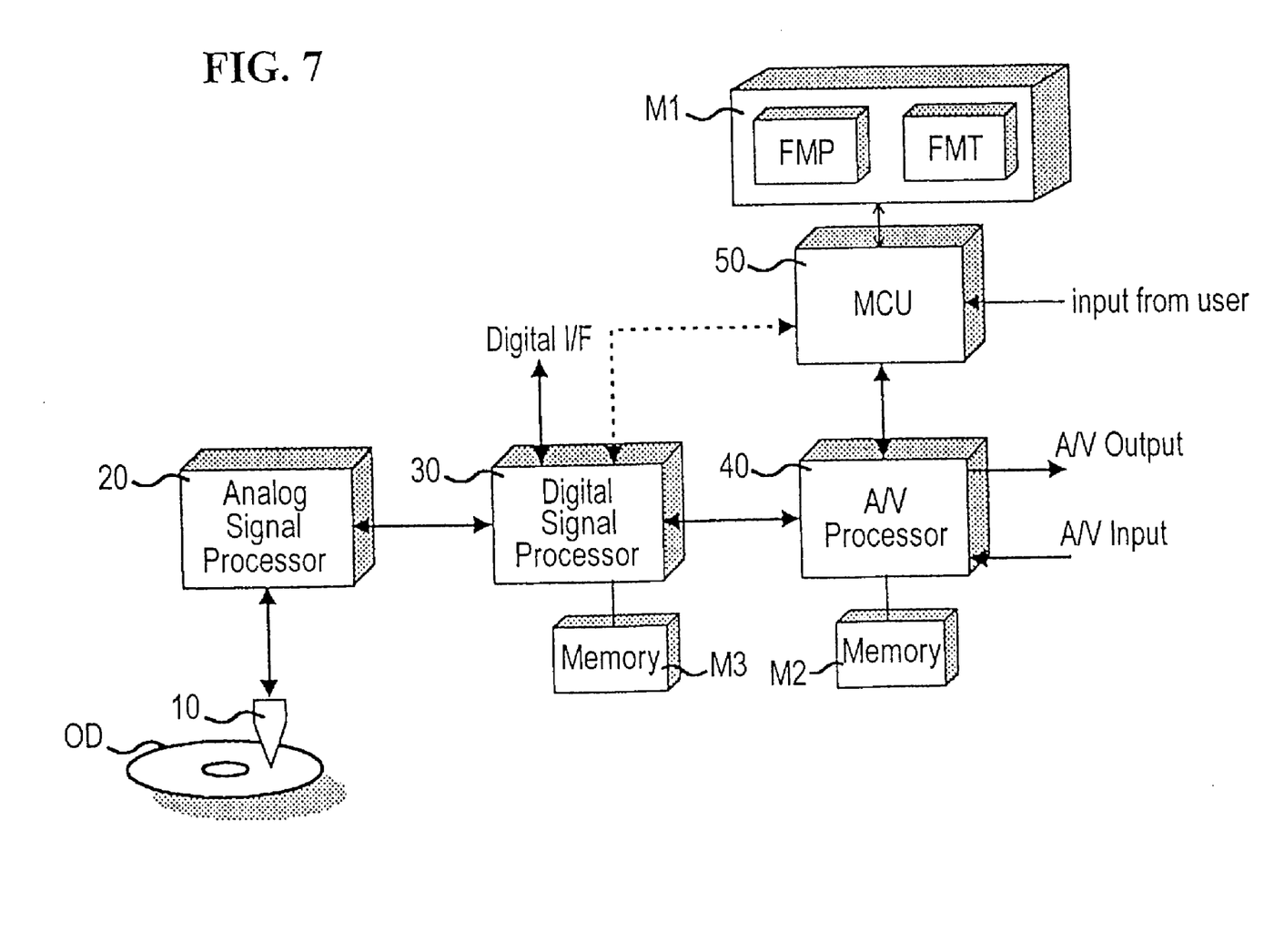
FIG. 7 is a schematic view of an information recording/reproduction apparatus to embody the method for creating and recording still picture management data of the present invention.

FIG. 7 is a schematic view of an optical information recording/reproduction apparatus, embodying the method for creating/recording still picture management data in a rewritable storage media according to the present invention.

The optical information recording/reproduction apparatus comprises an optical pickup 10 for recording information on an optical disk (OD) and detecting recorded information from the OD, an analog signal processing unit 20 for filtering and digitizing a reproduced high-frequency analog signal and for converting digital data into an analog signal to be recorded, a digital signal processing unit 30 for encoding and decoding the error correction code (ECC) block and issuing a control signal to the optical pickup 10 based on the data decoding result, an A/V processing unit 40 for decoding audio/video (A/V) data input and encoding an A/V signal into A/V data, a control unit 50 for controlling the above components and for controlling creation of navigation data for reproduction of A/V data, and multiple memory units M1, M2, and M3 for temporarily storing data generated during signal processing.

The memory M1 contains an FMP area for storing a file management program (FMP) and an FMT area for storing a file management table (FMT), wherein the FMT contains a VOBI table composed of VOBIs as shown in FIG. 4 and a cell information table composed of CIs as shown in FIG. 5.

When still pictures are recorded on the OD shown in FIG. 7, the control unit 50 controls each component of the apparatus so that still pictures and audio signals linked to the still pictures can be properly recorded on the OD. The control unit 50 keeps examining whether the attributes of the still pictures or audio signals linked to the still pictures are changed by a user during the recording process. On detecting an attribute change, the control unit 50 groups the still pictures recorded before the attribute change into a VOB, completes creation of the VOBI related to the VOB, as shown in FIG. 4, and stores the created VOBI in the VOBI table in the FMT area of the memory M1. On the other hand, if the number of recorded still pictures having attributes that remain unchanged reaches the maximum number preset by a user, the control unit 50 groups the still pictures and audio data linked to the still pictures into a VOB and repeats the aforementioned procedure. Also, in the case where power is out in the middle of acquisition of still pictures, the control unit 50 groups the still pictures and audio data linked to the still pictures recorded until then into a VOB, completes creation of the VOBI related to the VOB, and stores the created VOBI in the VOBI table in the FMT area of the memory M1. And then the navigation information stored in the memory M1 is recorded in the management data area of the OD.

Next, when reproduction of still pictures recorded on the OD are requested by a user, the file management program reads the PIC_S_N, PIC_E_N, PIC_STILL_TM, and PIC_PB_TM #1~PIC_PB_TM #L fields from the cell information table stored in the FMT area (see FIG. 5). Based on the obtained cell information, the control unit 50 controls each component of the apparatus so that still pictures recorded on the OD can be reproduced sequentially.

Figure 8:
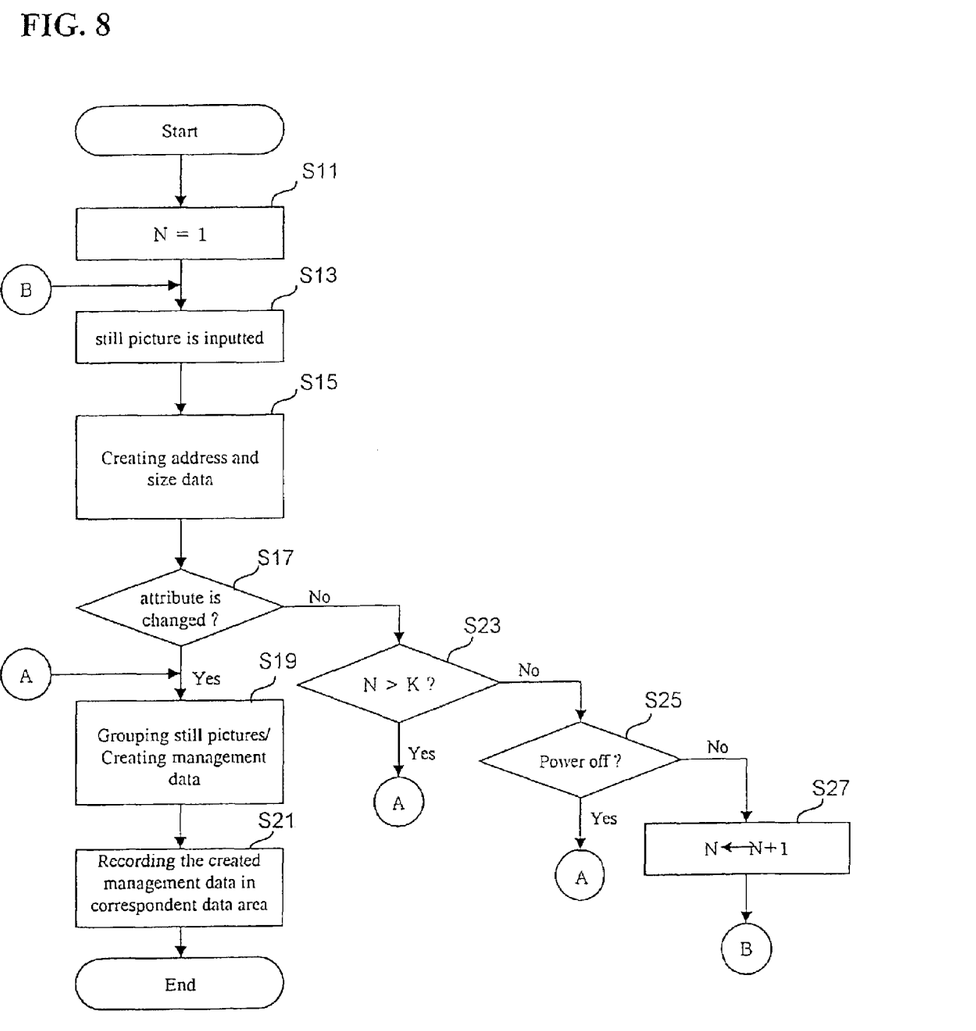
FIG. 8 is a flowchart of the method for creating and recording still picture management data of the present invention.

The method for creating/recording still picture management data in a rewritable storage media according to the present invention will be explained in detail in reference to the flow chart shown in FIG. 8.

Once a still picture recording mode has been set by a user, the control unit 50 first sets the number N of still pictures as 1 in an internal register (S11) and controls each component of the apparatus so that a still picture is recorded on the storage media (S13).

As the recorded still picture is the first element of the corresponding VOB, the file management program creates a VOBI in the FMT area of the memory M1 and records start addresses of video and audio parts of the still picture and their sizes in the fields of V_PART_S_ADR #1, A_PART_S_ADR #1, V_PART_SZ #1, and A_PART_SZ #1 in the VOBI, respectively (S15).

Next, the control unit 50 examines whether the attributes of the currently recorded still picture (or attributes of the audio data linked to the still picture) differ from those of the previously recorded still pictures (or those of the audio data linked to the previously recorded still pictures) belonging to a VOB (S17). If the attributes remain unchanged, the control unit 50 examines the internal register to confirm that the number of still pictures recorded so far (N) does not exceed a preset maximum number (K). If the number of still pictures recorded in the group exceed the preset maximum number (K), the control unit 50 examines whether power is out (S25). However, if the number of still pictures recorded in the group do not exceed the present maximum number (K), the control unit 50 executes step S19 explained later.

Provided power-off is detected in the step S25, the control unit 50 executes S19 explained later. If not, it increments the number N of recorded still pictures by 1 in step S27 and returns to S13 to repeat the aforementioned procedure. In this case, however, sizes of video and audio parts of the still picture are recorded in the corresponding fields of the existing VOBI without creating a new VOBI since the still picture is not the first element of the VOB to which the still picture belongs.

Returning to S17, if the attributes of the currently recorded still picture differ from those of the previously recorded still pictures, the control unit 50 groups the previously recorded still pictures into a VOB in step S19, records N in the field of STILL_PIC_Ns in the corresponding VOBI after decrementing N by 1, and finishes creation of the VOBI. Along with this, the control unit 50 creates a CI, as shown in FIG. 5, corresponding to the created VOBI and records it in the FMT area of the memory M1. Also, the control unit 50 deletes from the completed VOBI the size information of the last still picture recorded by S15 and creates a new VOBI in the FMT area of the memory M1, wherein start addresses of video and audio parts of the still picture and their sizes are recorded as above (S19). And, the control unit 50 records the whole file management data containing the completed VOBI in the storage media (S21), which finishes the creation of the VOBI.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method for organizing still picture management data via a recording/reproducing apparatus including a controller, the method comprising:
   examining, via the controller, attributes of still pictures to be recorded on a storage media;
   grouping, via the controller, management data for the still pictures into a plurality of VOBIs (Video Object Informations), each VOBI pertaining to multiple VOBs (Video Objects) corresponding to still pictures with common attributes; and
   in each of the VOBIs, creating, via the controller, management information to be shared among the VOBs associated with the corresponding VOBI without keeping or duplicating the common attributes for each of the VOBs,
   wherein the management information further includes a number of the still pictures and size information for each still picture in a corresponding group of still pictures assigned to the corresponding VOBI.

2. The method according to claim 1, wherein the management information contained in each of the VOBIs includes attribute information for the still pictures assigned to the corresponding VOBI.

3. The method according to claim 1, wherein the management information contained in each of the VOBIs includes information regarding a start address of the corresponding group of still pictures assigned to the corresponding VOBI.

4. The method according to claim 1, wherein the grouping includes:
   comparing attributes of a currently input still picture with attributes of previous still pictures assigned to a particular VOBI; and
   closing the particular VOBI without adding thereto the currently input still picture, and creating a CI (Cell Information) corresponding to the closed VOBI, if the attributes of the currently input still picture differ from the attributes of the previous still pictures.

5. The method according to claim 4, wherein the grouping further includes:
   creating a new VOBI and assigning the currently input still picture to the new VOBI;
   comparing attributes of a next input still picture with the attributes of the still picture assigned to the new VOBI; and
   closing the new VOBI without adding thereto the next still picture, and creating a new CI corresponding to the closed new VOBI, if the attributes of the next still picture differ from the attributes of the still pictures assigned to the new VOBI.

6. A method for organizing still picture management data via a recording/reproducing apparatus including a controller, the method comprising:
   providing, via the controller, a plurality of VOBIs (Video Object Informations) in a storage unit, each VOBI pertaining to multiple VOBs (Video Objects) corresponding to still pictures with common attributes, and each VOBI including video attribute information commonly corresponding to the VOBs assigned to that VOBI,
   wherein the video attribute information to be shared among the VOBs associated with the corresponding VOBI is created, via the controller without keeping or duplicating the common attributes for each of the VOBs, and
   wherein the management information further includes a number of the still pictures and size information for each still picture in a corresponding group of still pictures assigned to the corresponding VOBI.

7. The method according to claim 6, wherein the video attribute information identifies at least one of the following for the corresponding VOBI:
   video compression mode, TV system mode, aspect ratio, analog protection system mode, and video resolution.

8. The method according to claim 6, wherein the storage unit is either an optical disk or a memory separate from the optical disk for storing data associated with the optical disk.

9. The method according to claim 6, wherein each of the VOBIs further includes start address information of a first VOB assigned to that VOBI.

10. A non-transitory computer-readable storage medium embodied with a program code for a recording/reproducing apparatus to organize still picture management data, the medium comprising:
    a plurality of VOBIs (Video Object Informations) on the medium for managing video data via the recording/reproducing apparatus, each VOBI pertaining to multiple VOBs (Video Objects) corresponding to still pictures with common attributes, and each VOBI including video attribute information commonly corresponding to the VOBs assigned to that VOBI,
    wherein the video attribute information to be shared among the VOBs associated with the corresponding VOBI is created without keeping or duplicating the common attributes for each of the VOBs, wherein the computer-readable medium is configured to be read by the recording/reproducing apparatus and the still pictures are recorded/reproduced based on the VOBIs, and
    wherein the management information further includes a number of the still pictures and size information for each still picture in a corresponding group of still pictures assigned to the corresponding VOBI.

11. The non-transitory computer-readable storage medium according to claim 10, wherein the video attribute information identifies at least one of the following for the corresponding VOBI: video compression mode, TV system mode, aspect ratio, analog protection system mode, and video resolution.

12. The non-transitory computer-readable storage medium according to claim 10, wherein the medium is either an optical disk or a memory separate from the optical disk for storing data associated with the optical disk.

13. The non-transitory computer-readable storage medium according to claim 10, wherein each of the VOBIs further includes start address information of a first VOB assigned to that VOBI.

14. A reproducing apparatus, comprising:
   a receiver configured to receive a command requesting a reproduction of still pictures recorded in a recording medium; and
   a reproducing unit configured to reproduce still pictures based on management data,
   wherein the management data for the still pictures being grouped into a plurality of VOBIs (Video Object Informations) stored on the recording medium therein, each VOBI pertaining to multiple VOBs corresponding to still pictures with common attributes, and each VOBI including video attribute information commonly corresponding to the VOBs assigned to that VOBI,
   wherein the video attribute information to be shared among the VOBs associated with the corresponding VOBI is created without keeping or duplicating the common attributes for each of the VOBs, and
   wherein the management information further includes a number of the still pictures and size information for each still picture in a corresponding group of still pictures assigned to the corresponding VOBI.

15. The reproducing apparatus according to claim 14, wherein the video attribute information identifies at least one of the following for the corresponding VOBI: video compression mode, TV system mode, aspect ratio, analog protection system mode, and video resolution.

16. The reproducing apparatus according to claim 14, wherein each of the VOBIs further includes start address information of a first VOB assigned to that VOBI.

17. A method for reproducing still pictures via a reproducing apparatus including a receiver and a controller, comprising:
   receiving, via the receiver, a command requesting a reproduction of still pictures recorded in a recording medium via the reproducing apparatus; and
   reproducing, via the controller, still pictures based on management data via the reproducing apparatus,
   wherein the management data for the still pictures is grouped into a plurality of VOBIs (Video Object Informations) stored on the recording medium, each VOBI pertaining to multiple VOBs (Video Objects) corresponding to still pictures with common attributes, and each VOBI including video attribute information commonly corresponding to the VOBs assigned to that VOBI,
   wherein the video attribute information to be shared among the VOBs associated with the corresponding VOBI is created without keeping or duplicating the common attributes for each of the VOBs, and
   wherein the management information further includes a number of the still pictures and size information for each still picture in a corresponding group of still pictures assigned to the corresponding VOBI.

18. The method according to claim 17, wherein the video attribute information identifies at least one of the following for the corresponding VOBI: video compression mode, TV system mode, aspect ratio, analog protection system mode, and video resolution.

19. The method according to claim 17, wherein each of the VOBIs further includes start address information of a first VOB assigned to that VOBI.

20. A recording apparatus, comprising:
   an optical pickup configured to record still pictures on a storage media; and
   a control unit configured to examine attributes of the still pictures and to group management data for the still pictures into a plurality of VOBIs (Video Object Informations), each VOBI pertaining to multiple VOBs (Video Objects) corresponding to still pictures with common attributes,
   wherein in each of the VOBIs, the control unit creates management information to be shared among the VOBs associated with the corresponding VOBI without keeping or duplicating the common attributes for each of the VOBs, and
   wherein the management information further includes a number of the still pictures and size information for each still picture in a corresponding group of still pictures assigned to the corresponding VOBI.

* * * * *